Nov. 25, 1930.  E. A. VERNIA  1,782,948
CHECK WIRE GAUGE FOR CORN PLANTERS
Filed June 26, 1929
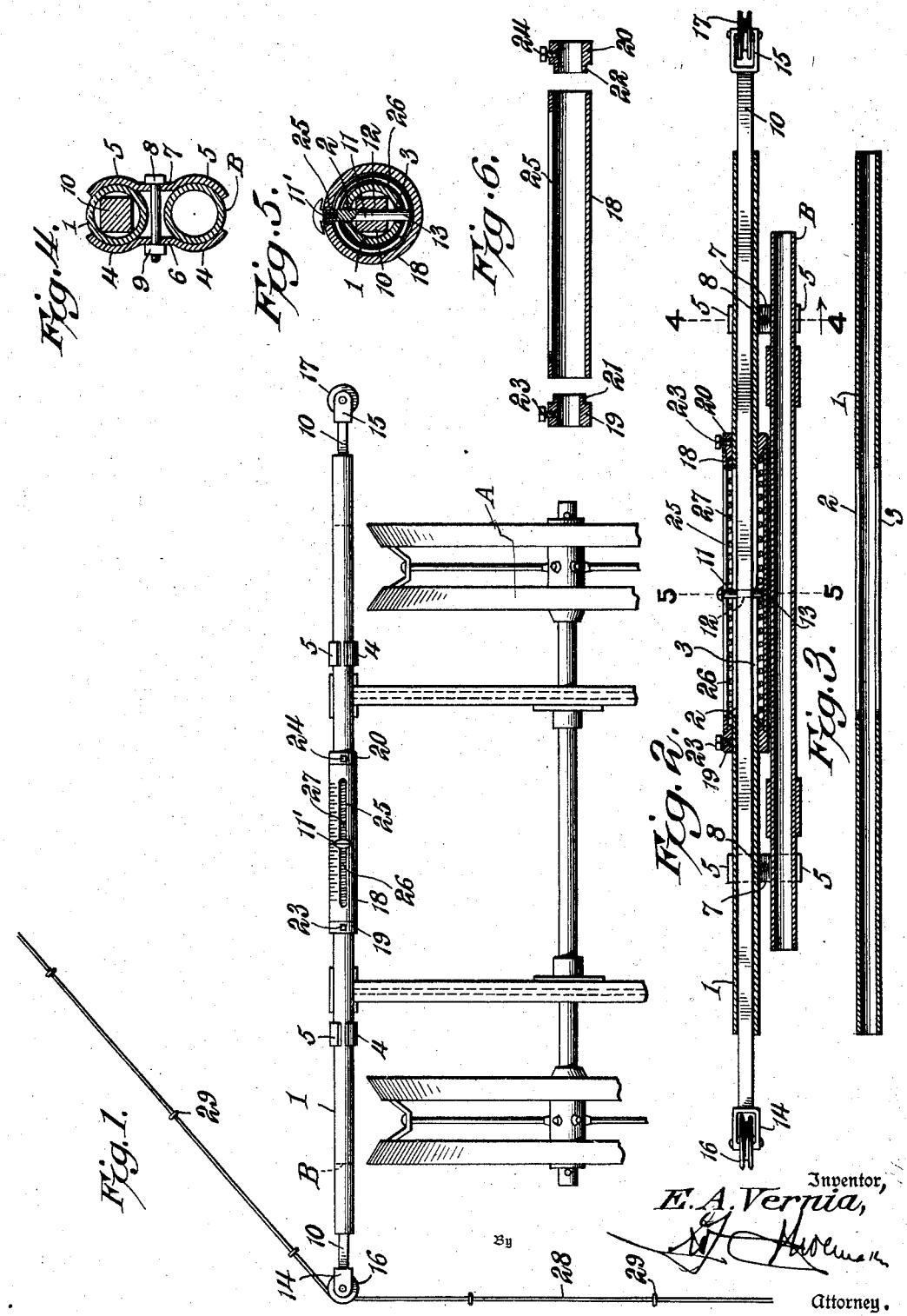
Inventor,
E. A. Vernia,
Attorney.

Patented Nov. 25, 1930

1,782,948

UNITED STATES PATENT OFFICE

ERNEST A. VERNIA, OF ODEBOLT, IOWA

CHECK-WIRE GAUGE FOR CORN PLANTERS

Application filed June 26, 1929. Serial No. 373,854.

This invention relates to a check wire gauge for corn planters, and more particularly relates to a gauge which is permanently mounted on the corn planter and which may be employed to indicate the proper tension of the check wire prior to setting the wire stakes at the end of the field.

An object of my invention is to provide a very simple, inexpensive and durable gauge which is removably attached to some part of the corn planter so that it is always readily available and cannot be misplaced or lost.

A further object of my invention is to provide a gauge which will indicate accurately the tension of the wire being set and which is operable from either side of the machine.

An additional object of the present invention is to provide a gauge which may be readily attached or detached to standard types of corn planters without any modification thereof.

Further objects and advantages of my invention will be clearly apparent as the description proceeds when taken in connection with the accompanying drawings, and while I have here illustrated what I consider the perferred embodiment of my invention, I desire it to be understood that modifications in the details of construction, arrangement of parts or the finish thereof may be resorted to without departing from the spirit or scope of the claims hereunto appended.

In the drawings:—

Figure 1 is a fragmentary plan view of my device attached to the rear of a conventional type of corn planter.

Fig. 2 is a vertical central sectional view through the gauge, as illustrated in Fig. 1, and through rear of the corn planter which supports the gauge.

Fig. 3 is a detail vertical sectional view of the sleeve surrounding the pointer rod.

Fig. 4 is a sectional view along the line 4—4 of Fig. 2.

Fig. 5 is a vertical sectional view through the line 5—5 of Fig. 2 and;

Fig. 6 is a detail sectional view of the indicia bearing sleeve and the means for securing the same in position.

Referring more particularly to the drawing, I have illustrated a conventional type of corn planter at A which is provided at its rear with the usual scraper bar or frame B, and while I illustrate the gauge as being secured to the scraper bar, it is to be understood that it may be secured to any part of the corn planter frame.

The gauge comprises a tubular or otherwise shaped sleeve 1 which is provided with elongated slots 2 and 3 at diametrically opposite points.

The sleeve 1 is secured to the scraper bar B of the planter by means of a clamp comprising the jaw members 4 and 5 connected by means of intermediate webs 6 and 7 through which the bolt 8 is adapted to pass and carries on the end thereof a nut 9 by means of which the jaw members 4 and 5 may be drawn into firm engagement with the scraper rod B of the corn planter and also into engagement with the tubular sleeve 1.

From an inspection of Figs. 1 and 3, it will be seen that two of such clamps are employed, but, it is of course, understood that any suitable number may be used as found desirable.

Slidably mounted within the tubular sleeve 1 is a pointer rod 10 carrying the pointer 11 intermediate the ends thereof, which pointer projects through an opening 12 in the pointer rod 10 and has its lower end 13 projecting below said rod 10.

At the upper end of the pointer 11, I provide a head of diamond or other suitable shape.

On the end of the pointer rod 10, I form suitable brackets 14 and 15 in which are journaled grooved rollers 16 and 17.

From the foregoing, it will be seen that by pulling the check wire at an angle over the roller 16, the tendency of the pointer rod 10, as illustrated in Fig. 2, will be to move to the right and that when the check wire is pulled over the roller 17, the pointer rod will move to the left, as illustrated in Fig. 2. It is necessary, therefore, to provide some means for returning the pointer rod 10 to its normal position, that is, where the pointer will register zero.

In order to accomplish this result, I provide an indicia sleeve 18 which encircles the tubular sleeve 1 and is secured thereto by means of collars 19 and 20 having reduced portions 21 and 22 fitting within the indicia sleeve 18 and the collars 19 and 20 are secured to the sleeve 1 by means of set screws 23 and 24 which bear upon the sleeve 1 and support the indicia sleeve 18 in spaced relation with the sleeve 1, the space being determined by the thickness of the reduced portions 21 and 22 of the collars 19 and 20.

The indicia sleeve 18 is provided with an elongated slot 25 which is adapted to register with the opposed elongated slots 2 and 3 in the tubular sleeve 1, and from an inspection of Fig. 2, it will be seen that the pointer 11 projects through the slots 2 and 3 in the sleeve 1, and the slot 25 in the indicia sleeve 18.

The sleeve 18 carries a suitable scale thereon, preferably starting with zero at its center and progressing toward opposite ends of the sleeve 18.

Within the space formed between the indicia sleeve 18 and the tubular sleeve 1, I provide a plurality of coiled springs 26 and 27 on opposite sides of the pointer 11.

The spring 26 bears at one end on the block 19 and at its opposite end against the pointer 11 and the spring 27 bears at one end against the block 20 and at its other end against the pointer 11.

It will be seen, therefore, that the springs 26 and 27 normally tend to maintain the pointer 11 at the center of the scale and that pressure applied to either of the rollers 16 or 17 will move the pointer correspondingly against the tension of the springs 26 and 27, but when the pressure is removed, the pointer returns to its normal central position on the scale.

By providing the pointer 11 with the extension 13, it will be seen that the springs 26 and 27 have a bearing surface on opposite sides of the pointer rod 10 and that, therefore, there is no tendency for the pointer rod 10 to stick or become jammed in the tubular sleeve 1 which would be likely to occur if the springs 26 and 27 bore against the pointer 11 at only one side of the pointer rod 10.

In Fig. 1, I have illustrated a check wire 28 provided with buttons or similar enlargements 29 by means of which the depositing mechanism of the corn planter is operated in the conventional manner, and it is to be noted that this check wire is drawn at an angle over the roller 16. The person operating the planter and desiring to tension the wire 28 to the desired degree may do so by pulling the wire 28 across the roller 16 at an angle as illustrated, whereupon the pointer 11 will be moved along the scale to indicate the degree of tension attained.

Upon determining such tension, the stake to which the wire 28 is attached may then be set. It is clearly apparent that by providing the two rollers 16 and 17, the foregoing operation may be carried out on either side of the machine.

It is further to be seen that while the device is detachably secured to the corn planter, it forms a permanent part of the same when applied and may not be readily lost or displaced so that it is always available when required for use as distinguished from known devices for the same purpose which usually comprise, so far as I am aware, spring gauges attached to the stakes and not to the corn planter itself.

In Fig. 6, I have indicated the head of the pointer 11 as being secured to the pointer by means of a screw threaded stud 11′, but it is to be understood that the head may be made integral therewith or may be secured to the pointer 11 in any suitable manner. In addition, I have illustrated the pointer rod 10 as being of rectangular cross section and while such construction offers less resistance to movement within the tubular sleeve 1, it is to be understood that I may employ a pointer rod of any suitable shape.

Additionally, it will be seen that my device is extremely simple, inexpensive and yet efficient, and that it can be applied by unskilled laborers to corn planters of conventional types without the necessity of making changes in the construction of the corn planter.

From the foregoing it will be seen that the gauge is operated by pulling the check wire around either of the rollers 16 or 17 at a forty five degree angle more or less and that the gauge is operated by pulling the wire in such a manner that the planter wires are always at exactly the same tension. Therefore, the corn is planted very much straighter than would be the case if the tension of the wires varied, and with my invention it has been found that with the wires at exactly the same tension, the field may be planted with the rows running crosswise of the field in a straight line in the direction in which the planter is traveling so that it is as easy to operate crosswise of the field as it is to operate in the direction in which the planter is driven.

What is claimed is:

1. A device of the character described comprising a sleeve for detachable connection with a planter, a rod slidable in the sleeve and carrying rollers at opposite ends thereof, a pointer on said rod movable therewith upon contact of one of said rollers with a check wire, an indicia carrying sleeve having a scale thereon cooperating with said pointer, and means for maintaining said pointer intermediate the ends of said indicia carrying sleeve.

2. A device of the character described comprising a sleeve adapted to be secured to a planter, a rod slidably mounted in said sleeve and carrying a pointer thereon, means on opposite ends of said rod engageable with a check wire, an indicia carrying sleeve having a scale thereon cooperating with said pointer, and means for normally maintaining said pointer at a point substantially intermediate the ends of said indicia carrying sleeve.

3. A device of the character described, comprising a sleeve, a rod slidable in said sleeve carrying a pointer thereon, an indicia carrying sleeve embracing the first mentioned sleeve and spaced therefrom, springs coacting with said pointer to normally maintain the pointer intermediate the ends of the indicia carrying sleeve, and means on opposite ends of the sliding rod engageable with the check wire.

4. In a device of the character described, a sleeve adapted to be secured to a planter, a rod slidable therein and carrying a pointer thereon, an indicia carrying sleeve embracing the first mentioned sleeve, spaced blocks on the first mentioned sleeve having reduced portions fitting within the ends of the indicia carrying sleeve and having means thereon for securing the same to the first mentioned sleeve, whereby the reduced portions of said blocks maintain the indicia carrying sleeve in spaced relation with the first mentioned sleeve, and springs on opposite sides of said pointer lying within said space and resiliently maintaining the pointer normally at a point intermediate the ends of the indicia carrying sleeve.

5. A device of the character described, comprising a sleeve adapted to be secured to a planter, a rod slidable in said sleeve and having rollers on its opposite ends engageable with a check wire, a pointer on said rod, the said sleeve having opposite elongated slots through which the pointer projects, an indicia carrying sleeve embracing the first mentioned sleeve and having an elongated slot therein registering with the slots in the first mentioned sleeve and through which said pointer projects, a scale on said indicia carrying sleeve, and springs within the last mentioned sleeve on opposite sides of the pointer and engaging the same to normally maintain the pointer at a point intermediate the ends of the indicia carrying sleeve.

6. A device of the character described comprising a hollow member adapted to be secured to a planter, a member slidable on said hollow member and having its ends projecting beyond the ends of the hollow member, the hollow member having a slot therein, a pointer carried by said second mentioned member and projecting through the slot of the hollow member, an indicia-carrying device connected to said hollow member and disposed with relation to the slot in the latter for coaction with said pointer, a scale on said indicia carrying device, and means for maintaining the pointer normally at a point intermediate the ends of the indicia carrying device and which is movable to different positions with relation to said scale under the influence of movement of said second mentioned member when actuated under the influence of a check wire operated over either of the ends of said second mentioned member.

In testimony whereof I have hereunto set my hand this 20th day of June, 1929.

ERNEST A. VERNIA.